(12) United States Patent
Artyomov et al.

(10) Patent No.: US 9,412,036 B2
(45) Date of Patent: Aug. 9, 2016

(54) METHODS AND SYSTEMS FOR OBJECT DETECTION BASED ON COLUMN-WISE AND ROW-WISE SUMS OF PIXEL VALUES

(71) Applicant: Samsung Electronics Co., Ltd., Suwon-Si, Gyeonggi-Do (KR)

(72) Inventors: Evgeny Artyomov, Rehovot (IL); Or Shimshi, Ramat Gan (IL); German Voronov, Ramat Gan (IL); Shlomo Somerstein, Ramat Gan (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 225 days.

(21) Appl. No.: 14/200,397

(22) Filed: Mar. 7, 2014

(65) Prior Publication Data

US 2015/0254522 A1   Sep. 10, 2015

(51) Int. Cl.
| | |
|---|---|
| G06K 9/46 | (2006.01) |
| G06K 9/66 | (2006.01) |
| G06T 7/00 | (2006.01) |

(52) U.S. Cl.
CPC ............ G06K 9/4647 (2013.01); G06T 7/0042 (2013.01)

(58) Field of Classification Search
CPC ....... G06K 9/4647; G06T 7/004; G06T 7/602
See application file for complete search history.

(56) References Cited

U.S. PATENT DOCUMENTS

| | | | |
|---|---|---|---|
| 6,456,737 B1 * | 9/2002 | Woodfill ................. G06K 9/32 348/47 |
| 6,915,022 B2 | 7/2005 | Huang et al. | |
| 7,099,510 B2 | 8/2006 | Jones et al. | |
| 7,613,357 B2 | 11/2009 | Owechko et al. | |
| 7,636,467 B2 * | 12/2009 | Burian ..................... G06K 9/38 382/154 |
| 8,194,134 B2 * | 6/2012 | Furukawa ............. G01S 3/7865 348/152 |
| 8,483,491 B2 * | 7/2013 | Yanada ................ G06K 9/4614 382/226 |
| 2005/0057540 A1 * | 3/2005 | Doyen ................... H04N 3/223 345/204 |
| 2008/0025631 A1 * | 1/2008 | Neal ................... G06K 9/00456 382/260 |
| 2010/0284619 A1 | 11/2010 | Song et al. | |
| 2011/0211233 A1 | 9/2011 | Yokono | |
| 2012/0099802 A1 * | 4/2012 | Washio .................. G06T 5/002 382/276 |
| 2012/0114172 A1 | 5/2012 | Du et al. | |
| 2013/0243329 A1 * | 9/2013 | Oro Garcia ........ G06K 9/00973 382/195 |
| 2015/0254522 A1 * | 9/2015 | Artyomov ............ G06K 9/4647 382/194 |

FOREIGN PATENT DOCUMENTS

| | | |
|---|---|---|
| JP | 2008027275 A | 2/2008 |
| KR | 20110019969 A | 3/2011 |
| KR | 101162878 B1 | 7/2012 |

\* cited by examiner

*Primary Examiner* — Gregory M Desire
(74) *Attorney, Agent, or Firm* — Harness, Dickey & Pierce

(57) ABSTRACT

In one example embodiment, a method includes determining at least one of integral column sums and integral row sums for pixels of an image and determining at least one of a column-wise sum of pixel values and a row-wise sum of pixel values associated with an area within the image based on at least one of the determined integral column sums and the determined integral row sums corresponding to a plurality of the pixels forming the area.

20 Claims, 14 Drawing Sheets

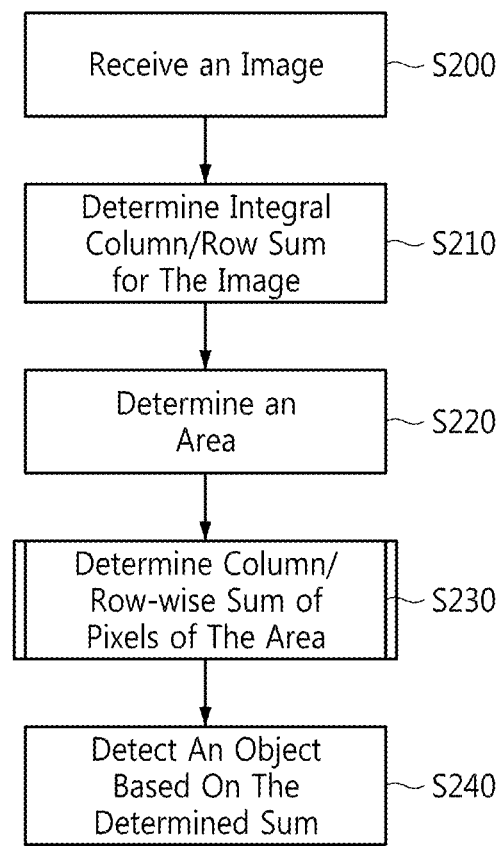

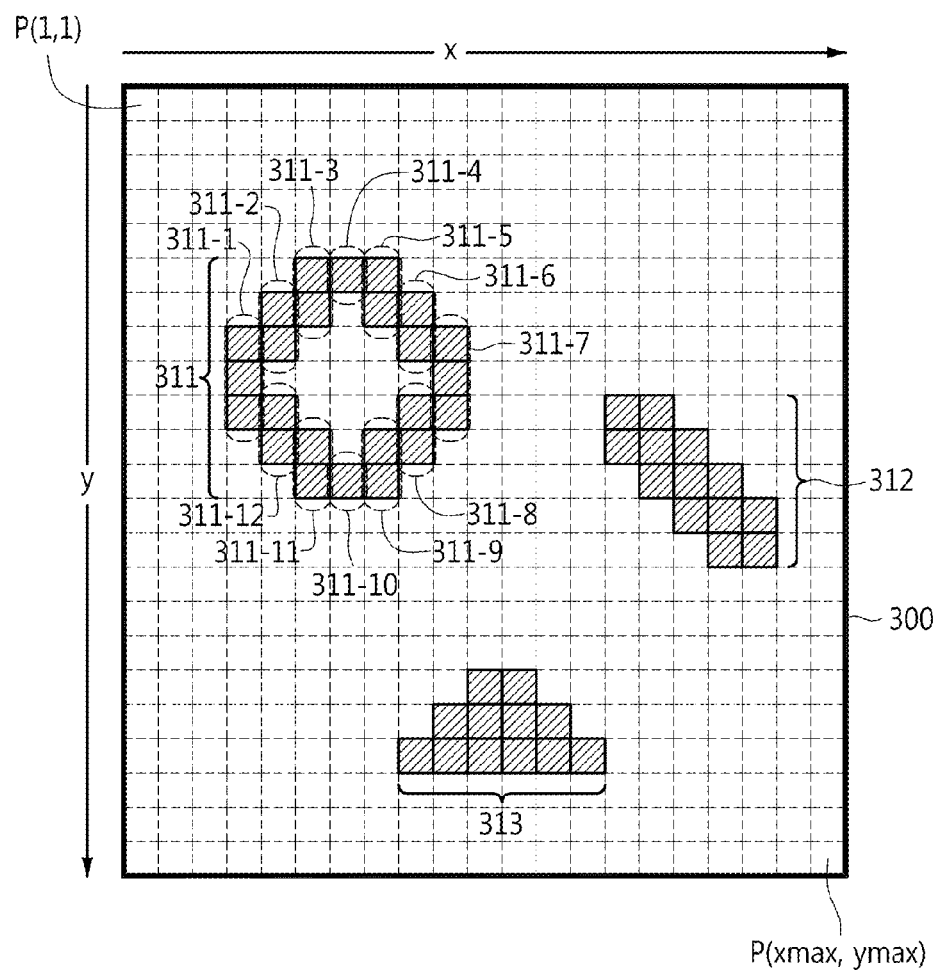

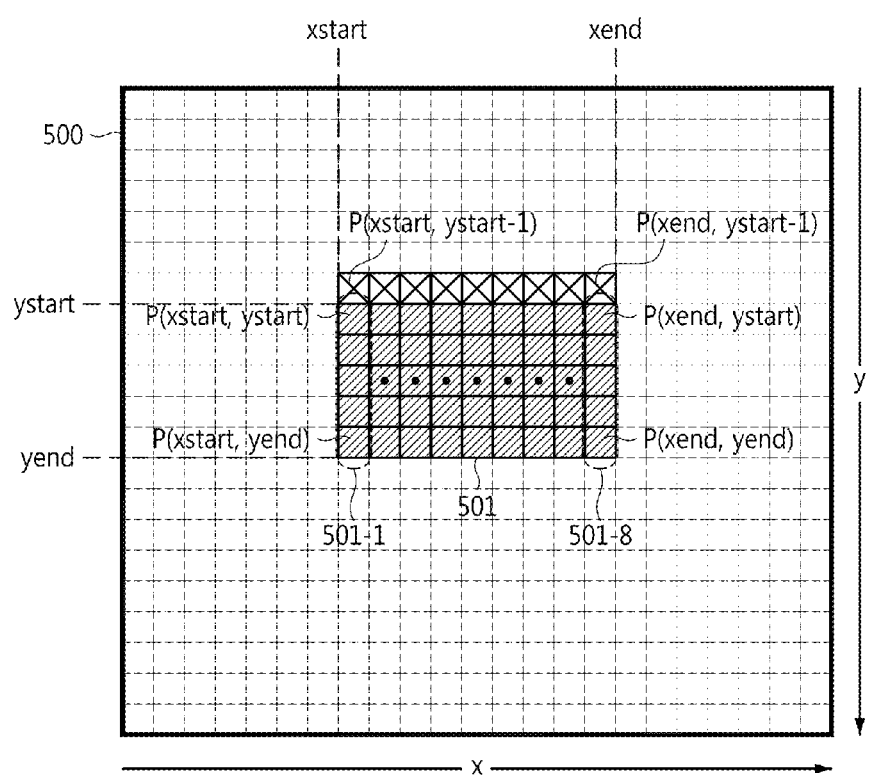

METHODS AND SYSTEMS FOR OBJECT DETECTION BASED ON COLUMN-WISE AND ROW-WISE SUMS OF PIXEL VALUES

BACKGROUND

Methods for detecting objects within an image, for example in the field of computer vision, require computer software programs configured to implement pixel summation computation in rectangular and/or non-rectangular areas.

Existing methods for determining a sum of pixels for detecting objects require extensive computational capacity and large memory. Furthermore, shapes of objects to be detected that require pixel summation of non-rectangular areas add further complexity to such methods.

SUMMARY

Some example embodiments relate to methods, apparatuses and/or computer program products to provide a hierarchical decomposition of a set of data/nodes.

In one example embodiment, a method includes determining at least one of integral column sums and integral row sums for pixels of an image and determining at least one of a column-wise sum of pixel values and a row-wise sum of pixel values associated with an area within the image based on at least one of the determined integral column sums and the determined integral row sums corresponding to a plurality of the pixels forming the area.

In yet another example embodiment, each pixel has an associated pixel value. For a first pixel in each column of pixels of the image, the determining the integral column sums includes determining a sum of the pixel value associated with the first pixel and any other pixel value associated with any other pixel in the corresponding column of pixels that precedes the first pixel. For a second pixel in each row of pixels of the image, the determining the integral row sums includes determining a sum of the pixel value associated with the second pixel and any other pixel value associated with any other pixel in the corresponding row of pixels that precedes the second pixel.

In yet another example embodiment, the method further includes determining the area for which at least one of the column-wise sum of pixel values and the row-wise sum of pixel values is to be determined.

In yet another example embodiment, the determining the at least one of the column-wise sum and the row-wise sum further includes identifying a plurality of portions forming the area, the plurality of portions being portions of columns forming the image when the determining determines the column wise sum and the plurality of portions being portions of rows forming the image when the determining determines the row-wise sum. The method further includes determining a first plurality of values, each of the first plurality of values representing one of the determined integral column sums or the determined integral row sums for a last pixel of one of the plurality of portions, a designation of a pixel as the last pixel being based on a direction of integration according to which the integral column sums or the integral row sums are determined.

In yet another example embodiment, the determining the at least one of the column-wise sum and the row-wise sum includes determining a second plurality of values, each of the second plurality of values representing a difference between one of the first plurality of values and one of the determined integral column sums or the determined integral row sums for a pixel immediately preceding the corresponding one of the plurality of portions.

In yet another example embodiment, the determining the at least one of the column-wise sum and the row-wise sum further includes determining a sum of the second plurality of values, the sum of the second plurality of values representing the at least one of the column-wise sum and the row-wise sum.

In yet another example embodiment, the determining the at least one of the column-wise sum and the row-wise sum includes identifying a plurality of portions forming the area, the plurality of portions being portions of columns forming the image when the determining determines the column wise sum and the plurality of portions being portions of rows forming the image when the determining determines the row-wise sum and grouping the identified plurality of portions into sets, each set including two or more of the plurality of identified portions. The determining the at least one of the column-wise sum and the row-wise sum further includes for each one of the sets, simultaneously determining a sum of a first plurality of values and a sum of a second plurality of values, wherein each of the first plurality of values represents one of the determined integral column sums or the determined integral row sums for a last pixel of one of the two or more of the plurality of identified portions of the corresponding one of the sets, a designation of a pixel as the last pixel being based on a direction of integration according to which the integral column sums or the integral row sums are determined and each of the second plurality of values represents one of the determined integral column sums or the determined integral row sums for a pixel immediately preceding the corresponding one of the two or more of the plurality of identified portions of the corresponding one of the sets. The determining the at least one of the column-wise sum and the row-wise sum further includes determining a plurality of difference values, each of the plurality of difference values representing the difference between the sum of the first plurality of values for one of the sets and the corresponding sum of the second plurality of values and summing the plurality of difference values.

In yet another example embodiment, the method further includes determining at least one additional area within the image and determining at least one of the column-wise sum and the row-wise sum associated with pixels forming the determined at least one additional area simultaneously with the determining of the at least one of the column-wise sum and the row-wise sum associated with the area.

In yet another example embodiment, the method further includes identifying a plurality of portions forming the area, the plurality of portions being portions of columns forming the image when the determining determines the column wise sum and the plurality of portions being portions of rows forming the image when the determining determines the row-wise sum, dividing the image into at least a first part and a second part and determining at least one of the integral column sums and the integral row sums for pixels of the image in each part of the image. The method further includes identifying in which of the first part and the second part, each of the plurality of portions falls wherein the determining the at least one of the column-wise sum and the row-wise sum determines the at least one of the column-wise sum and the row-wise sum based on the identified part of the image in which each of the plurality of portions falls.

In yet another example embodiment, wherein for one or more of the identified portions falling entirely within the first part or the second part, the determining the at least one of the column-wise sum and the row-wise sum includes determining a first plurality of values, each of the first plurality of values representing one of the determined integral column sums or the determined integral row sums for a last pixel of one of the identified plurality of portions falling entirely within the first part or the second part, a designation of a pixel as the last pixel being based on a direction of integration according to which the integral column sums or the integral row sums are determined. The determining the at least one of the column-wise sum and the row-wise sum further includes determining a second plurality of values, each of the second plurality of values representing a difference between one of the first plurality of values and one of the determined integral column sums or the determined integral row sums for of a pixel immediately preceding the corresponding one of the plurality of portions falling entirely within the first part or the second part. The determining the at least one of the column-wise sum and the row-wise sum further includes determining a first sum, the first sum being a sum of the second plurality of values.

In yet another example embodiment, for one or more of the identified portions falling within the first part and the second part, the determining the at least one of the column-wise sum and the row-wise sum includes determining a third plurality of values and a fourth plurality of values, wherein each of the third plurality of values represents one of the determined integral column sums or the determined integral row sums for a last pixel of a first segment of one of the identified portions falling within the first part and the second part, the first segment of the pixel values falling within the first part of the image and each of the fourth plurality of values represents one of the determined integral column sums or the determined integral row sums for a last pixel of a second segment of the one of the identified portions falling within the first part and the second part, the second segment of the pixel values falling within the second part of the image. The determining the at least one of the column-wise sum and the row-wise sum further includes determining a second sum, the second sum being a sum of the third plurality of values and the fourth plurality of values and determining a sum of the first sum and the second sum.

In yet another example embodiment, the method further includes detecting an object within the image based on at least one of the determined column-wise sum and the determined row-wise sum.

In one example embodiment, a processor is configured to determine at least one of integral column sums and integral row sums for pixels of an image and determine at least one of a column-wise sum of pixel values and a row-wise sum of pixel values associated with an area within the image based on at least one of the determined integral column sums and the determined integral row sums corresponding to a plurality of the pixels forming the area.

In yet another example embodiment, each pixel has an associated pixel value. For a first pixel in each column of pixels of the image, the processor is configured to determine the integral column sums by determining a sum of the pixel value associated with the first pixel and any other pixel value associated with any other pixel in the corresponding column of pixels that precedes the first pixel. For a second pixel in each row of pixels of the image, the processor is configured to determine the integral row sums by determining a sum of the pixel value associated with the second pixel and any other pixel value associated with any other pixel in the corresponding row of pixels that precedes the second pixel.

In yet another example embodiment, the processor is further configured to determine the area for which at least one of the column-wise sum of pixel values and the row-wise sum of pixel values is to be determined.

In yet another example embodiment, the processor is configured to determine the at least one of the column-wise sum and the row-wise sum by identifying a plurality of portions forming the area, the plurality of portions being portions of columns forming the image when the determining determines the column wise sum and the plurality of portions being portions of rows forming the image when the determining determines the row-wise sum and determining a first plurality of values, each of the first plurality of values representing one of the determined integral column sums or the determined integral row sums for a last pixel of one of the plurality of portions, a designation of a pixel as the last pixel being based on a direction of integration according to which the integral column sums or the integral row sums are determined.

In yet another example embodiment, the processor is further configured to determine the at least one of the column-wise sum of and the row-wise sum further by determining a second plurality of values, each of the second plurality of values representing a difference between one of the first plurality of values and one of the determined integral column sums or the determined integral row sums for a pixel immediately preceding the corresponding one of the plurality of portions.

In yet another example embodiment, the processor is configured to determine the at least one of the column-wise sum and the row-wise sum further by determining a sum of the second plurality of values, the sum of the second plurality of values representing the at least one of the column-wise sum and the row-wise sum.

In yet another example embodiment, the processor is configured to determine the at least one of the column-wise sum and the row-wise sum by identifying a plurality of portions forming the area, the plurality of portions being portions of columns forming the image when the determining determines the column wise sum and the plurality of portions being portions of rows forming the image when the determining determines the row-wise sum and grouping the identified plurality of portions into sets, each set including two or more of the plurality of identified portions. The processor is further configured to determine the at least one of the column-wise sum and the row-wise sum by, for each one of the sets, simultaneously determining a sum of a first plurality of values and a sum of a second plurality of values, wherein each of the first plurality of values represents one of the determined integral column sums or the determined integral row sums for a last pixel of one of the two or more of the plurality of identified portions of the corresponding one of the sets, a designation of a pixel as the last pixel being based on a direction of integration according to which the integral column sums or the integral row sums are determined and each of the second plurality of values representing one of the determined integral column sums or the determined integral row sums for a pixel immediately preceding the corresponding one of the two or more of the plurality of identified portions of the corresponding one of the sets. The processor is further configured to determine the at least one of the column-wise sum and the row-wise sum by determining a plurality of difference values, each of the plurality of difference values representing the difference between the sum of the first plurality of values for one of the sets and the corresponding sum of the second plurality of values and summing the plurality of difference values.

In yet another example embodiment, the processor is configured to determine at least one additional area within the image and determine at least one of the column-wise sum and the row-wise sum associated with pixels forming the determined at least one additional area simultaneously with the determining of the at least one of the column-wise sum and the row-wise sum associated with the area.

In yet another example embodiment, the processor is further configured to identify a plurality of portions forming the area, the plurality of portions being portions of columns forming the image when the determining determines the column wise sum and the plurality of portions being portions of rows forming the image when the determining determines the row-wise sum, divide the image into at least a first part and a second part and determine at least one of the integral column sums and the integral row sums for pixels of the image in each part of the image. The processor is further configured to identify in which of the first part and the second part, each of the plurality of portions falls and determine the at least one of the column-wise sum and the row-wise sum based on the identified part of the image in which each of the plurality of portions falls.

In yet another example embodiment, for one or more of the identified portions falling entirely within the first part or the second part, the processor is configured to determine the at least one of the column-wise sum and the row-wise sum by determining a first plurality of values, each of the first plurality of values representing one of the determined integral column sums or the determined integral row sums for a last pixel of one of the identified plurality of portions falling entirely within the first part or the second part, a designation of a pixel as the last pixel being based on a direction of integration according to which the integral column sums or the integral row sums are determined. The processor is configured to determine the at least one of the column-wise sum and the row-wise sum by determining a second plurality of values, each of the second plurality of values representing a difference between one of the first plurality of values and one of the determined integral column sums or the determined integral row sums for of a pixel immediately preceding the corresponding one of the plurality of portions falling entirely within the first part or the second part and determining a first sum, the first sum being a sum of the second plurality of values.

In yet another example embodiment, wherein for one or more of the identified portions falling within the first part and the second part, the processor is configured to determine the at least one of the column-wise sum and the row-wise sum by determining a third plurality of values and a fourth plurality of values, each of the third plurality of values represents one of the determined integral column sums or the determined integral row sums for a last pixel of a first segment of one of the identified portions falling within the first part and the second part, the first segment of the pixel values falling within the first part of the image, and each of the fourth plurality of values represents one of the determined integral column sums or the determined integral row sums for a last pixel of a second segment of the one of the identified portions falling within the first part and the second part, the second segment of the pixel values falling within the second part of the image. The processor is configured to determine the at least one of the column-wise sum and the row-wise sum by determining a second sum, the second sum being a sum of the third plurality of values and the fourth plurality of values and determining a sum of the first sum and the second sum, the sum of the first sum and the second sum representing the at least one of the column-wise sum and the row-wise sum.

In yet another example embodiment, the processor is further configured to detect an object within the image based on at least one of the determined column-wise sum and the determined row-wise sum.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein:

FIG. 2 illustrates a flowchart of a method for implementing a column-wise sum of pixel values, according to an example embodiment;

FIG. 3A-C illustrates various areas within an image, column-wise sum of pixel values of which is to be determined based on the method of FIG. 2, according to an example embodiment;

FIG. 5A-B illustrate examples of determining a column-wise and row-wise sum of pixel values based on the method described in FIG. 4, according to an example embodiment;

DETAILED DESCRIPTION OF EXAMPLE EMBODIMENTS

Figure 1:
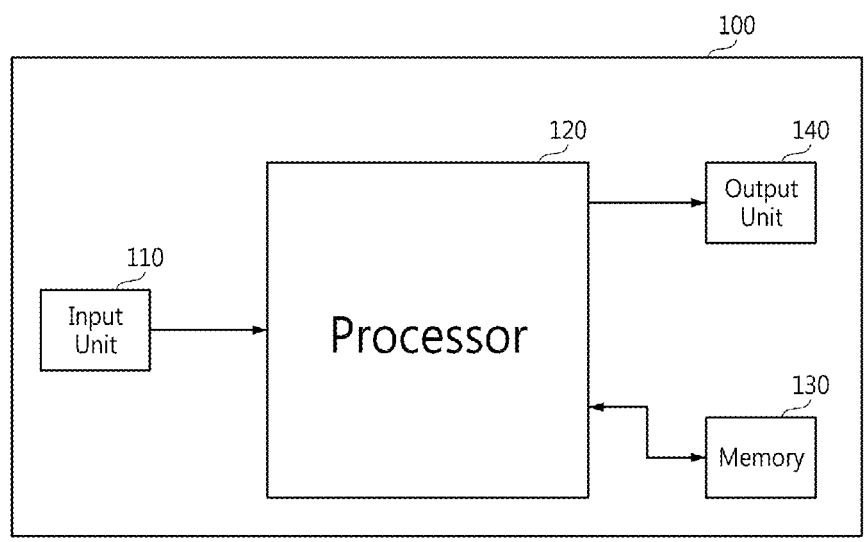
FIG. 1 illustrates a system for implementing a column-wise sum of pixel values, according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This disclosure may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/ acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory content. Information, arguments, parameters, data, etc. may be passed, forwarded, or transmitted via any suitable means including memory sharing, message passing, token passing, network transmission, etc.

FIG. 1 illustrates a system for implementing a column-wise sum of pixel values, according to an example embodiment. A system 100 may include an input unit 110, a processor 120, a memory 130 and an output unit 140. The system 100 may be any one of, but not limited to, a personal computer, a laptop, a handheld device, a smart phone, a camera or any other device with a processor capable of accepting/capturing an image and/or video and performing a detection of an object within such image/video. Hereinafter, the term image may be used to refer to both a static image (e.g., a photograph) and a moving image (e.g., a video).

The input unit 110 may be any one of, but not limited to, a camera configured to capture an image and/or an input unit configured to receive as an input, data (e.g., images, videos, etc.) to be processed by the processor 120 (e.g., a USB, a memory card, etc.). The input unit 110 may additionally, or alternatively, receive the input data (e.g., images, videos, etc.) via an external device (not shown). The communication between the external device and the input unit 110 may be any known or to be developed means for a wired and/or wireless communication.

The processor 120 may be in communication with the memory 130 and configured to execute instructions stored in the memory 130. For example, the processor 120 may be configured to execute instructions for performing pixel summation for object detection in an image, which will be further described below.

The memory 130 may be any type of storage medium capable of storing data and/or computer instructions for determining sum of pixel values.

The output unit 140 may be a display device associated with the system 100. The output unit 140 may be configured to display objects detected within an image, inputted via input unit 110 and analyzed by the processor 120. In one example embodiment, the output unit 140 may not be a part of the system 100 but rather a separate unit in communication with the system 100 via any known or to be developed wired and/or wireless communication.

FIG. 2 illustrates a flow chart of a method for implementing a column-wise sum of pixel values, according to an example embodiment. At S200, the processor 120 receives an image from the input unit 110. The image may be a photograph or a video. The image may be represented by a matrix of numbers, each of which may correspond to the brightness of the associated pixel. For example, in a grayscale image, a pixel value may be a single number that represents a brightness of the corresponding pixel. One pixel format may be byte image, which is a number stored as an 8-bit integer giving a range of possible values from 0 to 255, where zero is associated with the black color and 255 is associated with the white color. Values in between 0 and 255 make up the different shades of gray. In a color representation of an image, separate red, green and blue components may be specified for each pixel (assuming a red, green, blue (RGB) color space). Accordingly, a pixel 'value' may actually be a vector of three numbers stored in three separate 'grayscale' images known as color planes (one for each of red, green and blue), which may be recombined when displaying or processing the color image. In one example embodiment, the actual grayscale and/or color component intensities for each pixel may not be stored explicitly. In such cases, an index into a color map in which the actual intensity or colors may be looked up, may be stored for each pixel.

At S210, the processor 120 may determine an integral column/row sum for the pixels of the received image. In one example embodiment, the processor 120 may determine the integral column sum as follows, with reference to FIGS. 2-3A.

Figure 3A:
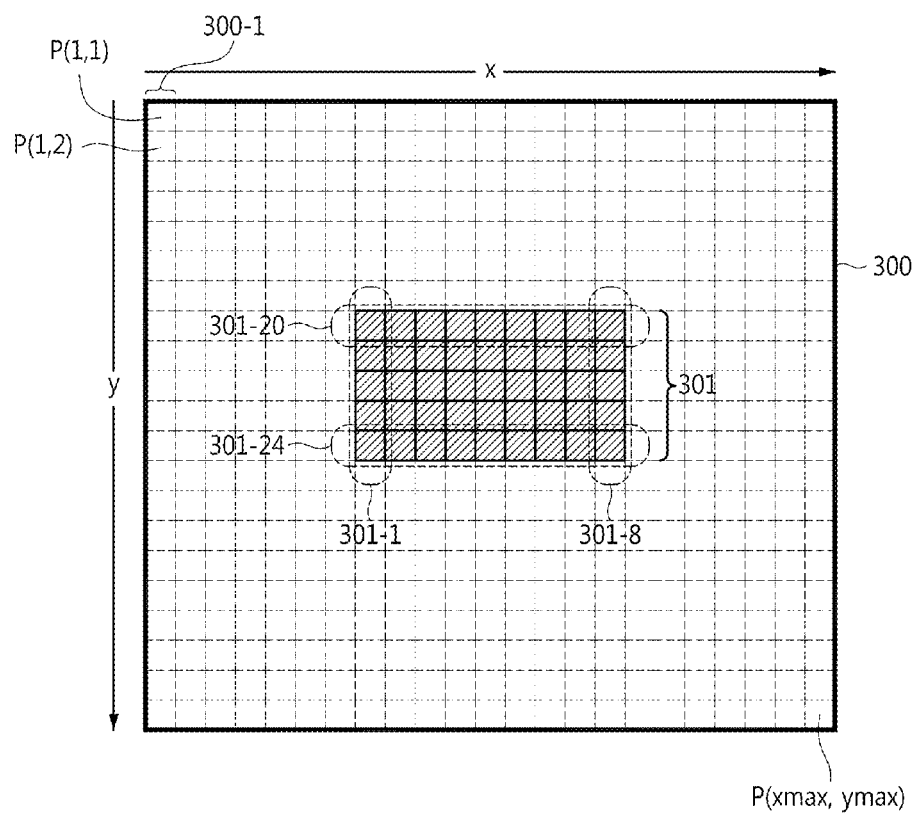

FIG. 3A illustrates an image 300. The value of each pixel of the image 300 may be represented by P(x,y), with x and y representing pixel coordinates ranging from 1 to the maximum value of x and y (e.g., P(1,1) to P(xmax,ymax)). Values of xmax and ymax may depend on the number of pixels forming the image 300. For example for an image with a 512*512 dimensions, P values may be represented by P(1,1) to P(512,512). Even though P(1,1) is shown in FIG. 3A as the pixel value of the left upper corner pixel of the image 300, it will be appreciated that the location of P(1,1) may depend on the direction of the horizontal/vertical axes and thus may change (e.g., P(1,1) may correspond to the pixel value of the upper right corner pixel, lower left corner pixel of the image 300, etc.). Accordingly, the location of P(xmax,ymax) may change as well.

In one example embodiment, the pixel value of the central pixel of the image 300 may be designated as P(0,0). Accordingly x and y may take on both positive and negative values and the upper corner pixels and the lower corner pixel coordinates may change accordingly (e.g., P(xmin,ymax), P(xmax,ymax), P(xmin,ymin), P(xmax,ymin), etc.).

Let IC(i,j) represent an integral column sum for the $(i,j)^{th}$ pixel of the $i^{th}$ column of the image 300, while j varies between 1 to ymax. Accordingly, the processor 120 may determine each IC(i,j) based on the following formula:

$$IC(i,j) = \Sigma_{m=1}^{j} P(i, m) \qquad (1)$$

where P(i,m) may represent a pixel value of the $(i,m)^{th}$ pixel for m varying between 1 and j.

Accordingly, for column 300-1 of the image 300, the IC(1, 1) for the (1,1) pixel is equal to P(1,1), IC(1,2) for the pixel (1,2) is the sum of P(1,1) and P(1,2), etc. Accordingly, for the column 300-1, the processor 120 may determine a number of integral column sums, where the number of integral column sums may depend on the number of pixels forming the column 300-1. For example, if 'ymax' is 21, as shown in FIG. 3A, then for column 300-1, the processor 120 may determine 21 integral column sums. The processor 120 may determine the integral column sums for the remaining columns of the image 300, in a similar manner, thus determining integral column sums for the pixels of the image 300.

In one example embodiment, the processor 120, in a similar manner as that described above for determining integral column sums for each column of the image 300, may determine integral row sums for rows forming the image 300. For example, the processor 120 may determine the integral row sums, as follows:

Let IR(i,j) represent an integral row sum for the $(i,j)^{th}$ pixel of the $j^{th}$ column of the image 300, while i varies between 1 to xmax. Accordingly, the processor 120 may determine each IR(i,j) based on the following formula:

$$IR(i,j) = \Sigma_{m=1}^{i} P(m, j) \qquad (2)$$

where P(m,j) may represent a pixel value of the $(m,j)^{th}$ pixel with m varying between 1 and i.

Accordingly, at the end of S210, the processor 120 may have determined an integral column sum and/or an integral row sum for each pixel of the image 300.

At S220, the processor 120 may determine at least one area within the image, the sum of pixel values of which may be utilized to detect an object within the image. For example, given an image, the processor 120 may scan the entire image using the determined area, which may also be referred to as a scanning window. The window may take on any shape and any size, including, but not limited to, a rectangular shaped window, a circular shaped window, a square shaped window, etc. The processor 120 may choose the determined area randomly from a group of available shapes and/or may choose the determined area upon receiving a command for choosing a particular determined area.

Figure 3C:
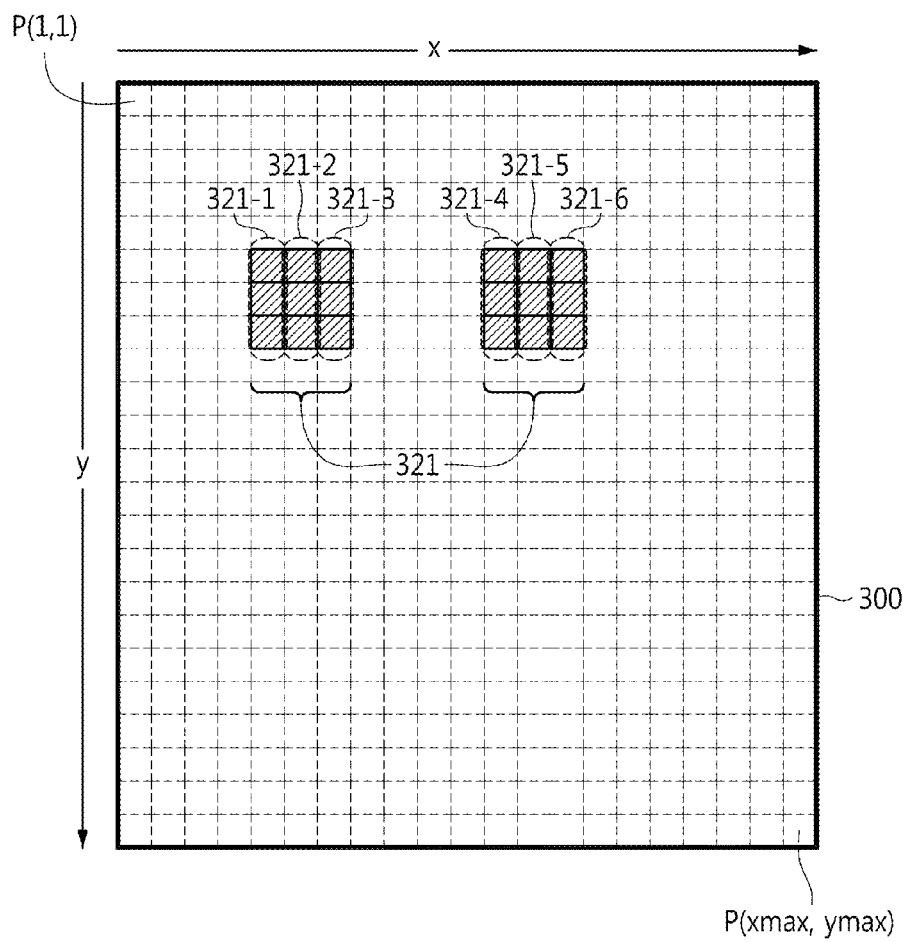

FIG. 3A-C illustrate various areas (e.g., scanning windows) within an image, column-wise sum of pixel values of which is to be determined based on the method of FIG. 2, according to an example embodiment.

The determined areas within an image 300 may be any one of the area 301 in FIG. 3A, areas 311-312 in FIG. 3B and the disconnected area 321 in FIG. 3C, respectively. Each of the determined areas, 301, 311-313 and 321 have different shapes within the image 300. It will be appreciated that the form and location of the determined areas shown in FIGS. 3A-C are for illustrative purpose only and the determined area may take on any shape or form.

Figure 4:
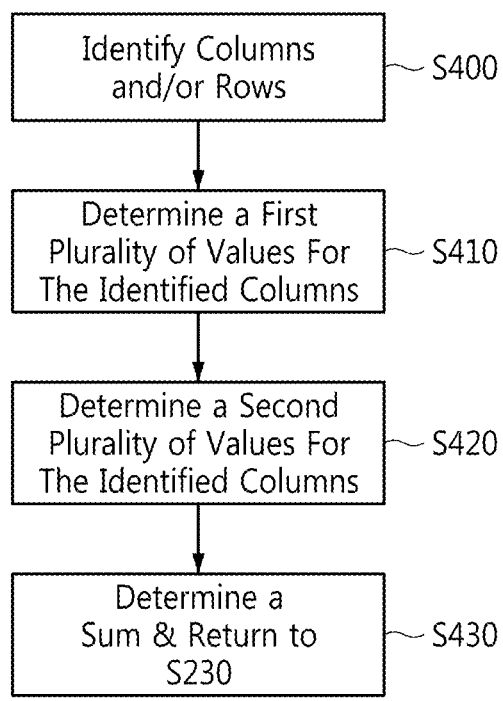
FIG. 4 illustrates a flowchart of a method for implementing a column-wise sum described in FIG. 2, according to an example embodiment.

Referring back to FIG. 2, at S230, the processor 120 may determine a column-wise sum of pixels that form the determined area within the image 300. FIG. 4 illustrates a flow chart of a method for implementing a column-wise sum described in FIG. 2, according to an example embodiment.

With reference to FIGS. 3-4, at S400, the processor 120 identifies the columns of the image 300, portions of which form the determined area (e.g., portions of the columns forming the area 301). For example, the processor 120 may determine that the determined area 301 shown in FIG. 3A, is formed of portions of 8 columns of the image 300 (301-1 to 301-8). The processor 120 may determine that the determined area 311 shown in FIG. 3B is formed of portions of 12 columns of the image 300 (311-1 to 311-12). In a similar manner the processor 120 may determine that the disconnected area 321 of FIG. 3C is formed of portions of 6 columns of the image 300 (321-1 to 321-6).

In one example embodiment, the processor 120 identifies rows of the image 300, portions of which form the determined area 301 (e.g., rows 301-20-301-24 shown in FIG. 3A), instead of and/or concurrent with identifying the column portions 301-1 to 301-8 of the determined area 301.

Figure 5B:
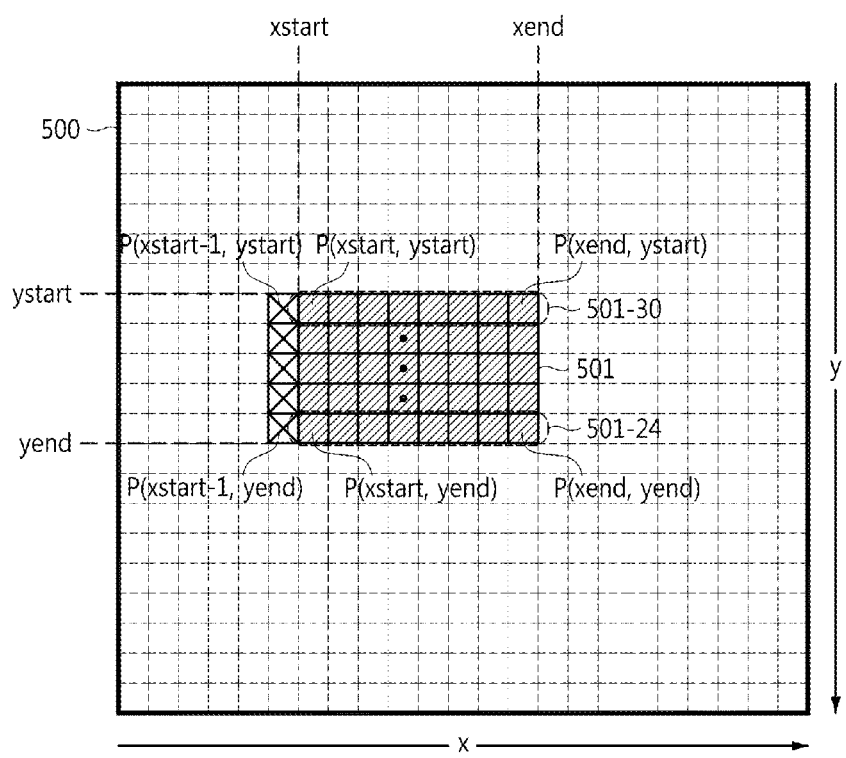

FIG. 5A-B illustrate examples of determining a column-wise (and/or row-wise sum) of pixel values based on the method described in FIG. 4, according to an example embodiment.

In one example embodiment shown in FIG. 5A, the processor 120, determines that the shaded determined area 501 is formed of portions of 8 columns of the image 500, starting at xstart and ending at xend. Similarly, the processor 120 determines that the area 501 is formed of portions of 5 rows of the image 500, starting at ystart and ending at yend, which will be described with reference to FIG. 5B below. Therefore, the example determined area 501 of FIGS. 5A-B is 5 rows by 8 columns rectangular area. It will be appreciated that the form of the determined area 501 as well as portions of the columns/rows shown in FIGS. 5A-B are for illustrative purposes only. The determined area may take on any form, as described with reference to example embodiment of FIGS. 3A-C and may be formed of any number of columns/rows forming an image (e.g., image 300). In addition, the determination of the variables xstart, xend, ystart and yend may depend on the directions of the horizontal (x) and vertical (y) axes.

At S410, the processor 120 determines a first plurality of values. Each of the first plurality of values may correspond to an integral column sum, determined at S210, for the last pixel of one of the identified portions of columns 501-1 to 501-8 forming the determined area 501. In FIG. 5A, each of the first plurality of values may correspond to integral column sums IC(xstart,yend), IC(xstart,yend+1), . . . , IC(xend,yend), determined at S210, for P(xstart,yend), P(xstart, yend+1), . . . , P(xend,yend), respectively, as shown in FIG. 5A.

At S420, the processor 120 may determine a second plurality of values corresponding to the first plurality of values determined for the portions of the columns forming the determine area 501. Each of the second plurality of values may represent a difference between one of the first plurality of values (e.g., one of IC(xstart,yend), . . . , IC(xstart,yend+1)) and an integral column sum, determined at S210, for a pixel immediately preceding the corresponding one of the column portions forming the determined area 501 (e.g., IC(xstart, ystart−1), . . . , IC(xend, ystart−1) determined at S210 for P(xstart,ystart−1), . . . , P(xend,ystart−1), respectively). P(xstart,ystart−1), . . . , P(xend,ystart−1) are identified with "x" in FIG. 5A. It will be appreciated that the coordinate of the pixel immediately preceding the corresponding one of column portions forming the determined area 501 may depend on the directions of the integration (e.g., summation) of the pixel values and/or the directions of the horizontal (x) and vertical (y) axes.

The processor 120 may determine each of the second plurality of values, as follows. With reference to FIG. 5A, because the processor has determined 8 IC(i,j)s as the first plurality of values, the processor 120 may accordingly determine 8 different values for the second plurality of values. Each of the 8 second plurality of values may be represented by a value D(k), with k varying between xstart and xend in increments of 1. Therefore, D(k) may be determined based on the following formula:

$$D(k)=IC(k, yend)-IC(k,ystart-1) \quad (3)$$

At S430, the processor 120 may determine a column-wise SUM of the second plurality of values, which may represent the sum of the pixel values forming the determined area (e.g., area 501 in FIG. 5A), according to the following formula:

$$SUM=\Sigma_{k=xstart}^{xend} D(k) \quad (4)$$

Alternatively and/or concurrently with determining the first plurality of values and the second plurality of values, at S410-S430, the processor 120 may determine a third plurality of values and a fourth plurality of values with respect to portions of rows of the image 500 forming a determined area (e.g., determined area 501). While the first and second plurality of values may be utilized to determine a column-wise sum of pixels forming a determined area, the third and fourth plurality of values may be utilized to determine a row-wise sum of pixels forming the determined area. In one example embodiment, the column-wise sum and the row-wise sum of the pixel values forming a determined area may be the same.

Each of the third plurality of values may correspond to an integral row sum, determined at S210, for the last pixel of one of the identified portions of rows forming the determined area 501 while each of the fourth plurality of values may correspond to a difference between one of the third plurality of values and an integral row sum determined at S210 for a pixel immediately preceding a corresponding one of the row portions forming the determined area 501. As described above, the determined area 501 is formed of portions of 5 rows of the image 500.

In the example embodiment shown in FIG. 5B, the processor 120 determines each of the third plurality of values as an integral row sum for the last pixel of one of the identified portions of rows 501-20 to 501-24 forming the determined are 501. Accordingly, each of the third plurality of values may correspond to one of IR(xend, ystart), . . . , IR(xend, yend) determined at S210 for P(xend, ystart) to P(xend, yend), respectively.

Upon determining the third plurality of values, the processor 120 may determine the fourth plurality of values. Each of the fourth plurality of values may represent a difference between one of the third plurality of values (e.g., one of the IR(xend, ystart), . . . , IR(xend, yend))) and an integral row sum determined at S210 for a pixel immediately preceding the corresponding one of the row portions forming the determined area 501 (e.g., one of IR(xstart−1, ystart), . . . , IR(xstart−1, yend) determined at S210 for P(xstart−1,ystart), . . . , P(xstart−1,yend), respectively). P(xstart−1,ystart), . . . , P(xstart−1,yend) are identified with "x" in in FIG. 5B. It will be appreciated that the coordinate of the pixel immediately preceding the corresponding one of the row portions forming the determined area 501 may depend on the directions of the integration (e.g., summation) of the pixel values and/or the directions of the horizontal (x) and vertical (y) axes.

The processor 120 may determine each of the fourth plurality of values, as follows. With reference to FIG. 5B, because the processor has determined 5 IR(i,j)s as the third plurality of values, the processor 120 may accordingly determine 5 different values for the fourth plurality of values. Each of the 5 values may be represented by a value S(w), with w varying between ystart and yend in increments of 1. Therefore, S(j) may be determined based on the following formula:

$$S(w)=IR(xend, w)-IR(xstart-1,w) \quad (5)$$

At S430, the processor 120 may determine a row-wise SUM of the fourth plurality of values, which may represent the sum of the pixel values forming the determined area (e.g., area 501 in FIG. 5B), according to the following formula:

$$SUM=\Sigma_{w=ystart}^{yend} S(w). \quad (6)$$

In one example embodiment, the processor 120 may determine both the column-wise SUM of the pixel values as well as row-wise SUM of the pixel values, described above. Thereafter, the processor 120 may compare the column-wise SUM with the row-wise SUM in order to analyze the robustness of the underling method/analysis. In one example embodiment, the processor 120 may keep a log of the number of times the SUMs match as well as a number of times the SUMs do not match. The log may be stored on the memory 130 and may be referenced by an operator/user for future modifications and improvements to the system 100.

Referring back to FIG. 2, the processor 120 may return, at S230, the column-wise SUM determined at S430 (and/or alternatively row-wise SUM), as the column-wise sum and/or row-wise sum of pixels forming the determined area. Thereafter, at S240, the processor 120 may detect an object within the underlying (e.g., image 300, 500, etc.) based on the SUM, determined at S430. The processor 120 may detect an object based on the SUM, using any well-known technique, including but not limited to the Viola-Jones technique for detecting features in an image. For example, when the processor 120 determines the SUM, the value of the SUM as well as a position of the determined area may be compared to a database (may also be referred to as a training database) to determined feature(s) (e.g., facial features) that may be present in the determined area The processor 120 may output the detected object to the output unit 140 and/or may simply output the determined column-wise sum and/or row-wise sum.

Accordingly, a system employing the processor 120 that has been configured to implement the method described with reference to FIGS. 2 and 4 may use less storage capacity for storing images and less complex computer instructions for computing sum of pixel values in an attempt to detect an object within an image. More importantly, the column-wise (and/or row-wise) determination of pixel values enables easy detection of shapes other than rectangular shapes (e.g., determining pixel summation of non-rectangular areas) such as the areas depicted in FIGS. 3A-C, circular shapes, etc.

Hereinafter, various example embodiments will be described according to which the time and storage capacity for determining the column-wise sum of the pixel values may be further reduced.

For implementing the process of calculating the column-wise SUM described with reference to FIG. 5A, the processor 120 receives 8 clock cycles. In other words, there are 8 calculation cycles. In each cycle one of IC(i,j)s is determined and the respective integral column sum for a preceding pixel is subtracted therefrom. Thereafter the processor 120 determines the column-wise SUM of the pixels of a determined area, described with respect to FIG. 5A. Similarly, there are 5 clock signals, corresponding to the 5 rows of the determined area (e.g., area 501), based on which the processor 120 determines the row-wise SUM of the pixels of a determined area, described with respect to FIG. 5B.

Figure 6A:
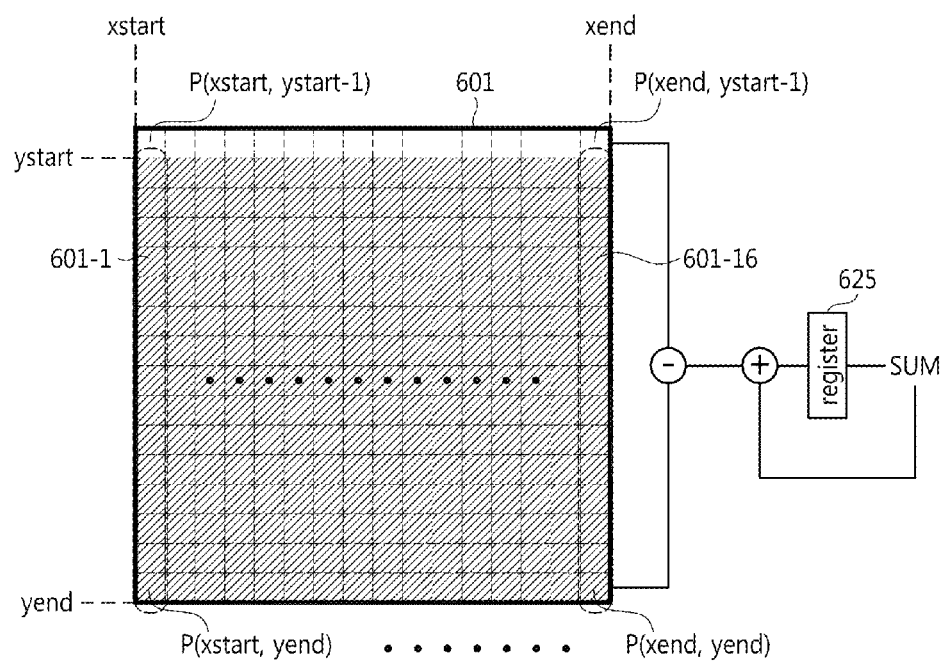
FIG. 6A-B illustrate a process for optimizing/reducing time for implementing the method described in FIG. 5, according to an example embodiment.
Figure 6B:
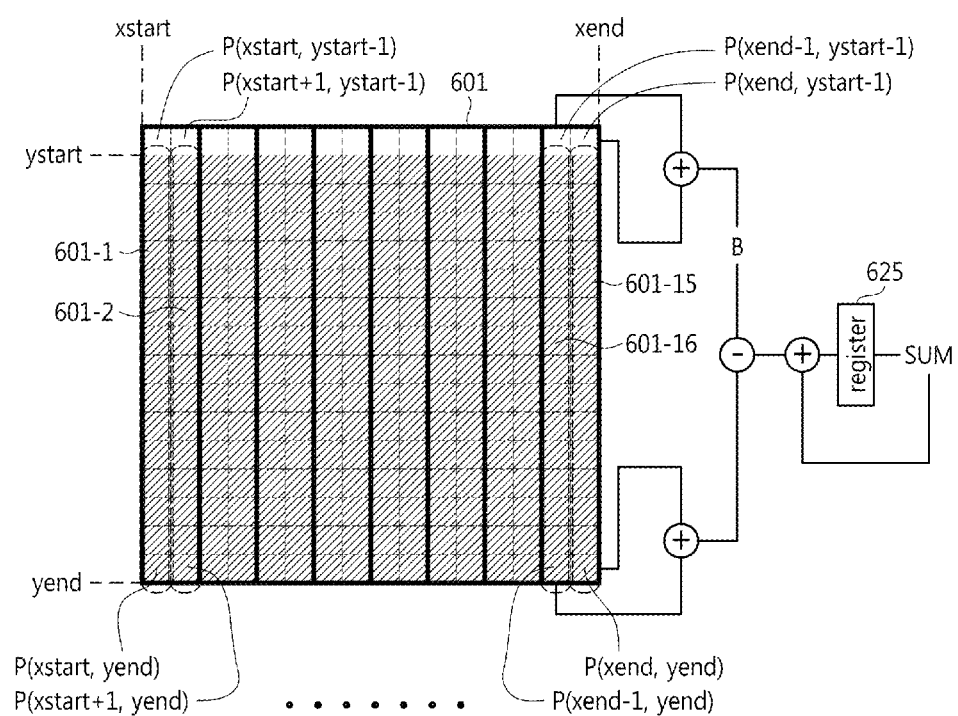

Accordingly, in one example embodiment, by implementing parallel analysis, the timing of carrying out the process of determining the SUM may be reduced. FIG. 6A-B illustrate a process for optimizing/ reducing time for implementing the method described in FIGS. 5A-B, according to an example embodiment. FIG. 6A-B illustrate a comparison between a one-column approach and a two-column approach, according to an example embodiment.

FIG. 6A illustrates an example determined area 601 with 16 columns (e.g., column portions 601-1 to 601-16). Accordingly, as described above, determining the SUM is based on 16 clock signals corresponding to the 16 columns, portions of which form the determined area 601. During a cycle of each clock signal received by the processor 120, a value IC(i,j) corresponding to a last pixel of one of the portions of the columns forming the determined area 601 (e.g., P(xstart, yend), . . . , P(xend, yend) for a corresponding one of the portions 601-1, . . . , 601-16, respectively) is determined by the processor 120. The variable i may vary from xstart to xend in increments of 1 with each clock signal, while the variable j may not change (e.g., remain at yend) for the determined area 601. Also during the cycle, the processor 120 subtracts an IC(i,j) for a pixel immediately preceding a corresponding one of the column portions forming the determined area 601(e.g., P(xstart,ystart−1), . . . , P(xend,ystart−1) from the IC(i,j) of the last pixel of the corresponding one of the column portions (e.g., (IC(xstart,yend)−IC(xstart, ystart−1)), . . . , (IC(xend, yend)−IC(xend, ystart−1)). Finally, during the cycle, the processor 120 may add each subtracted value to the SUM, which is being stored in either the memory 130 of FIG. 1, described above or the register/buffer 625 shown in FIG. 6A.

The same process illustrated in FIG. 6A with respect to portions of the columns forming the determined area 601, may also be implemented with 16 clock cycles for the portions of the rows forming the determined area 601 (the area 601 is formed of portions of 16 rows of the corresponding image.

FIG. 6B illustrates an example two-column approach for determining a column-wise sum of pixel values of a determined area, which reduces the calculation time, according to one example embodiment. As shown in FIG. 6B, the 16 portions of columns forming the determined area 601 are grouped into pairs of columns portions (e.g., {601-1, 601-2}, . . . , {601-15, 601-16}. For example, during the cycle of the first clock signal, the processor 120, in parallel, determines two of the first plurality of values for portions of the columns forming the area 601 that fall within the corresponding pair (e.g. IC(xstart, yend) and IC(xstart+1, yend) corresponding to P(start, yend) and P(xstart+1, yend) of the column portions 601-1 and 601-2, respectively). During the cycle of the first clock signal, the processor 120 also determines a sum of IC(i,j)s for two pixels immediately preceding the corresponding one of the column portions for which the two of the first plurality of values have been determined (e.g., IC(xstart, ystart−1) and IC(xstart+1, ystart−1) for P(xstart, ystart−1) and P(xstart+1,ystart−1), respectively). During the cycle of the first clock signal, the processor 120 subtracts the sum of IC(i,j)s for the two pixels immediately preceding the corresponding one of the column portions for which the two of the first plurality of values have been determined, from the sum of two of the first plurality of values and may further add the subtracted value to a SUM value. The processor 120 may repeat the same process during each of the remaining clock signals for each pair of column portions forming the determined area 601 and at the end of each cycle may update the SUM value by adding the respective subtracted value to the SUM. Accordingly, the timing and the memory usage during the process for determining a column-wise sum of the pixel values forming the determined area 601 may be reduced in half (from 16 clock signals to 8 clock signals).

It will be appreciated that the grouping of the columns, forming the determined area 601, into pairs is just for illustrative purposes. The processor 120 may group together any number of portions of columns forming the determined area (e.g., groups of 3 portions, groups of 4 portions, etc.). Accordingly, the timing for determining the sum of pixel values of a given area within an image (e.g., image 300) may be reduced by a factor, where the factor may depend on the number of portions grouped together (e.g., by a factor of 3, if 3 column portions are grouped together, etc.).

The same process illustrated in FIG. 6A with respect to portions of the columns forming the determined area 601, may also be implemented for the portions of the rows forming the determined area 601 (e.g., grouping every 3 portions of the rows forming the area 601 into one group and thus determining the sum of pixel values in 5 cycles, where 5 is derived from having 15 rows divided into 5 groups of 3 row portions).

Figure 7:
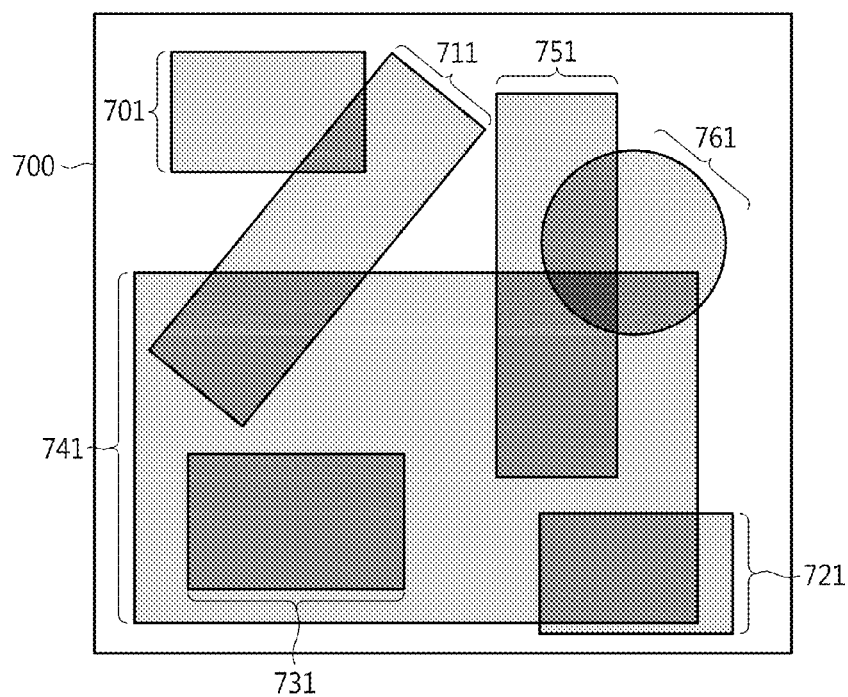
FIG. 7 illustrates a process for massive parallel computation, according to an example embodiment.

FIG. 7 illustrates a process for massive parallel computation, according to an example embodiment. For example, the processor 120 may be configured to detect multiple objects with the image 700. Each of the multiple objects may be detected using a particular determined area (e.g., 701, 721, 731, 741, 751, 761, etc.). Massive parallel computation may allow the processor 120 to determine sum of pixel values for each determined area shown in FIG. 7, separately and in parallel with the determination of the other determined areas. Once the sum of pixel values for the different areas are determined, the areas and their corresponding values may be overlaid and analyzed by the processor 120 so as to determine/detect the multiple objects in the image 700, using any well-known technique, including but not limited to Viola-Jones feature detecting technique.

Figure 8A:
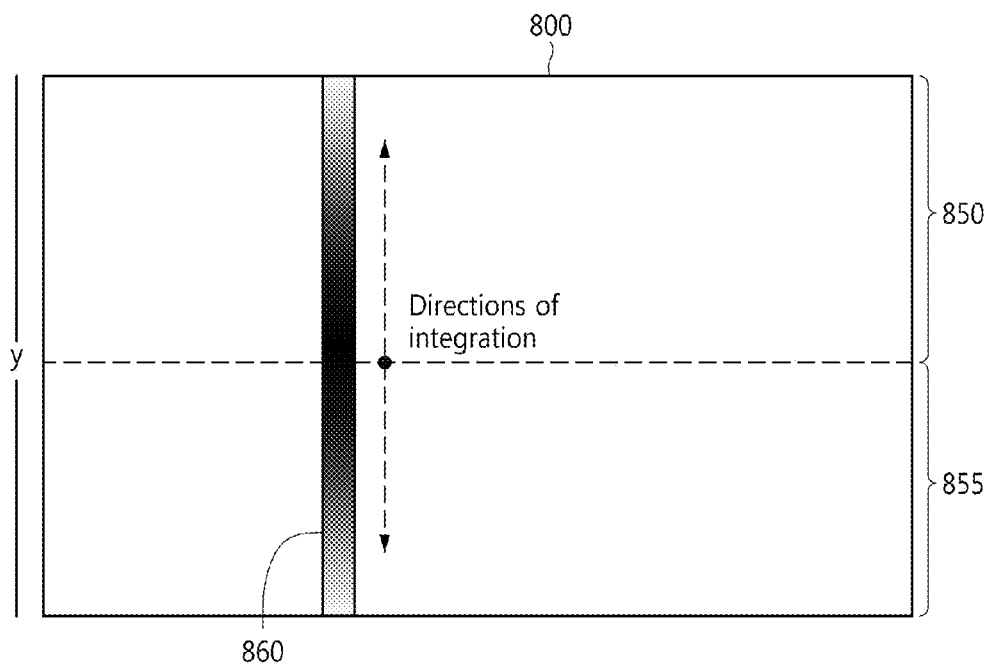
FIG. 8A-B illustrates a process for achieving memory requirement reduction while implementing the method described and illustrated with respect to FIGS. 2-5A-B, according to an example embodiment.
Figure 8B:
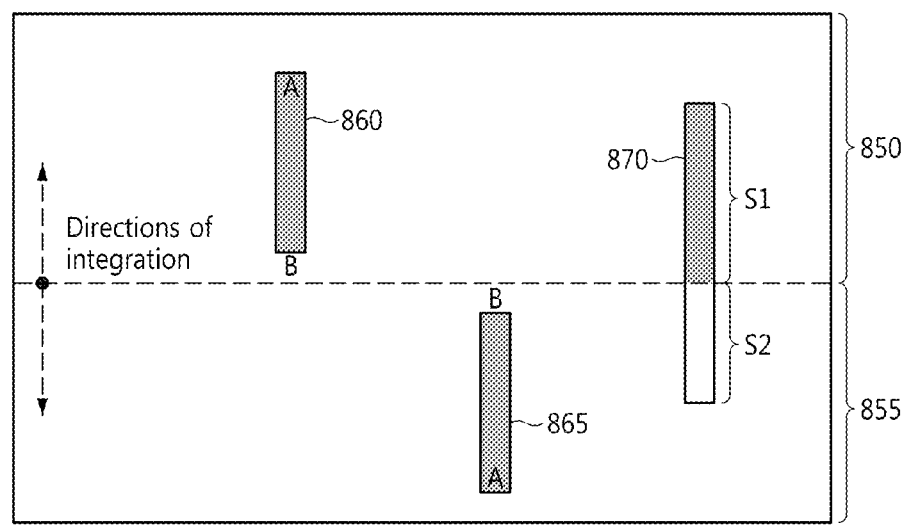

In one example embodiment, in order to further reduce memory requirement, the processor 120 may split the image into two or more parts and carry out the method described with respect to FIGS. 2 and 4, for each half. FIG. 8A-B illustrates a process for achieving memory requirement reduction while implementing the method described and illustrated with respect to FIGS. 2-5A-B, according to an example embodiment.

According to FIG. 8A, in one example embodiment, the processor 120 may split the image 800 into a first part and a second part (e.g., two segments 850 and 855). The processor 120 may split the image 800 into segments having equal sizes or alternatively into segments having different sizes.

Thereafter, the processor 120 may determine the integral column/row sums for each segment, as described with respect to S210 of FIG. 2, except that the integral column/row sum may be determined in a direction of integration for each segment (e.g., the direction of integration for the segment 850 is upward and the direction of integration for the segment 855 is downward, as shown in FIG. 8A).

Subsequently and upon determining the plurality of column portions which form a determined area within the image 800, as described with respect to S400 of FIG. 4, the processor 120 determines in which one of the segments each column portion falls. For example, as shown in FIG. 8B, if a given column portion falls entirely within one of the segments (e.g., the column portion 860 falls entirely within the segment 850 and the column portion 865 falls entirely within the segment 855), the processor 120 determines the corresponding one of the first plurality of values and the corresponding one of the second plurality of values based on the methodology described above and in accordance with the direction of integration for the segment in which the given column falls (e.g., the direction of integration for the segment 850 is upward and the direction of integration for the segment 855 is downward).

However, if a given column portion (e.g., column portion 870) falls within two or more of the segments determined by the processor 120 (e.g., the column 870 falls within both segments 850 and 855), then the processor 120 determines the corresponding one of the first and second plurality of values as follows.

In the example embodiment shown in FIG. 8B. The processor 120 determines the integral column sum for the last pixel of a first part of portion 870 that falls within the segment 850 in the direction of integration of the segment 850 (This value may be denoted by "S1"). The processor 120 also determines the integral column sum for the last pixel of a second part of the portion 870 that falls within the segment 855, in the direction of integration of the segment 855 (This value may be denoted by "S2"). Thereafter, the processor 120 may determine a sum of "S1" and "S2" in order to determine one of the first plurality of values corresponding to the column portion 870. Note that the determination of the sum for the column portion 870 may not involve any further subtraction of an integral column-sum corresponding to a pixel immediately preceding the portion 870, as may be the case for columns falling entirely within one of the segments, described above. This may be due to the fact that, for example, the first part of the portion 870 starts from a point of segmentation of the image 300 and thus, in the direction of the integration in the first segment, no pixel is present immediately preceding the pixels forming the first part. The same reasoning may apply to the second part of the portion 870.

Therefore, for a given determined area for which one or more of the portions of the columns forming the determined area may fall entirely within one of the segments and one or more of the remaining portions of the columns fall within two or more of the segments, the processor 120 may individually determine each of the first plurality of values as well as the second plurality of values (if applicable), as described above with reference to FIG. 8B. Thereafter, the processor may sum the determined values, as described with reference to S430 of FIG. 4, which results in determining the SUM of the pixel values of the given determined area.

Figure 9:
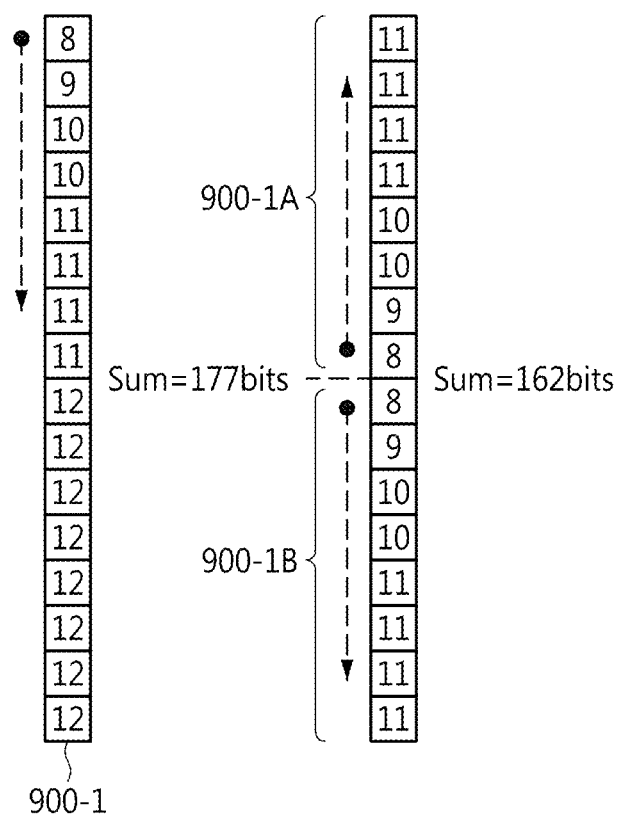
FIG. 9 illustrates a comparison between the number of bits required for determining the integral column sum with or without using the process shown in FIGS. 8A-B, according to an example embodiment.

FIG. 9 illustrates a comparison between the number of bits required for determining the integral column sum with or without using the process shown in FIGS. 8A-B, according to an example embodiment. By implementing the process described above with reference to FIG. 8A-B, reduction in the memory requirement may be achieved. For example, as shown in FIG. 9, for an image in which each column is formed of 16 pixels, if the processor 120 determines the integral column sums for each pixel of a given column (e.g., column 900-1) in only one direction (e.g., without splitting the image into segments as shown in FIGS. 8A-B, the number of bits required to determine the integral column sum for each pixel in the given column may be 177 bits. On the other hand, splitting the image into two segments and determining the integral column sums for each part (e.g., 900-1A and 900-1B) of the column 900-1, falling in one of the two segments, may result in the processor using 162 bits. Therefore, the number of bits used by the processor 120 may be reduced by 8.5% (e.g., ((177−162)/177)*100).

Variations of the example embodiments are not to be regarded as a departure from the spirit and scope of the example embodiments, and all such variations as would be apparent to one skilled in the art are intended to be included within the scope of this disclosure.

What is claimed:

1. A method executed by a processor, the method comprising:
    determining at least one of integral column sums and integral row sums of an image, each of the integral column sums being associated with a first pixel in a column of pixels of the image and corresponding to a sum of a pixel value of the first pixel and any other pixel value associated with any other pixel in the column of pixels that precedes the first pixel, each of the integral row sums being associated with a second pixel in a row of pixels of the image and corresponding to a sum of a pixel value of the second pixel and any other pixel value associated with any other pixel in the row of pixels that precedes the second pixel;
    determining at least one of a column-wise sum of pixel values and a row-wise sum of pixel values associated with an area within the image based on at least one of the determined integral column sums and the determined integral row sums corresponding to a plurality of the pixels forming the area; and detecting an object within the image based on at least one of the determined column-wise sum and the determined row-wise sum.

2. The method of claim 1, further comprising:
determining the area for which at least one of the column-wise sum of pixel values and the row-wise sum of pixel values is to be determined.

3. The method of claim 1, wherein the determining the at least one of the column-wise sum and the row-wise sum comprises:
identifying a plurality of portions forming the area, the plurality of portions being portions of columns forming the image when the determining determines the column wise sum and the plurality of portions being portions of rows forming the image when the determining determines the row-wise sum;
determining a first plurality of values, each of the first plurality of values representing one of the determined integral column sums or the determined integral row sums for a last pixel of one of the plurality of portions, a designation of a pixel as the last pixel being based on a direction of integration according to which the integral column sums or the integral row sums are determined.

4. The method of claim 3, wherein the determining the at least one of the column-wise sum of and the row-wise sum further comprises:
determining a second plurality of values, each of the second plurality of values representing a difference between one of the first plurality of values and one of the determined integral column sums or the determined integral row sums for a pixel immediately preceding the corresponding one of the plurality of portions.

5. The method of claim 4, wherein the determining the at least one of the column-wise sum and the row-wise sum further comprises:
determining a sum of the second plurality of values, the sum of the second plurality of values representing the at least one of the column-wise sum and the row-wise sum.

6. The method of claim 1, wherein the determining the at least one of the column-wise sum and the row-wise sum comprises:
identifying a plurality of portions forming the area, the plurality of portions being portions of columns forming the image when the determining determines the column wise sum and the plurality of portions being portions of rows forming the image when the determining determines the row-wise sum;
grouping the identified plurality of portions into sets, each set including two or more of the plurality of identified portions;
for each one of the sets, simultaneously determining a sum of a first plurality of values and a sum of a second plurality of values, wherein
each of the first plurality of values represents one of the determined integral column sums or the determined integral row sums for a last pixel of one of the two or more of the plurality of identified portions of the corresponding one of the sets, a designation of a pixel as the last pixel being based on a direction of integration according to which the integral column sums or the integral row sums are determined, and
each of the second plurality of values represents one of the determined integral column sums or the determined integral row sums for a pixel immediately preceding the corresponding one of the two or more of the plurality of identified portions of the corresponding one of the sets;
determining a plurality of difference values, each of the plurality of difference values representing the difference between the sum of the first plurality of values for one of the sets and the corresponding sum of the second plurality of values; and summing the plurality of difference values.

7. The method of claim 1, further comprising:
determining at least one additional area within the image; and
determining at least one of the column-wise sum and the row-wise sum associated with pixels forming the determined at least one additional area simultaneously with the determining of the at least one of the column-wise sum and the row-wise sum associated with the area.

8. The method of claim 1, further comprising:
identifying a plurality of portions forming the area, the plurality of portions being portions of columns forming the image when the determining determines the column wise sum and the plurality of portions being portions of rows forming the image when the determining determines the row-wise sum;
dividing the image into at least a first part and a second part;
determining at least one of the integral column sums and the integral row sums for pixels of the image in each part of the image; and
identifying in which of the first part and the second part, each of the plurality of portions falls; wherein
the determining the at least one of the column-wise sum and the row-wise sum determines the at least one of the column-wise sum and the row-wise sum based on the identified part of the image in which each of the plurality of portions falls.

9. The method of claim 8, wherein for one or more of the identified portions falling entirely within the first part or the second part, the determining the at least one of the column-wise sum and the row-wise sum comprises:
determining a first plurality of values, each of the first plurality of values representing one of the determined integral column sums or the determined integral row sums for a last pixel of one of the identified plurality of portions falling entirely within the first part or the second part, a designation of a pixel as the last pixel being based on a direction of integration according to which the integral column sums or the integral row sums are determined;
determining a second plurality of values, each of the second plurality of values representing a difference between one of the first plurality of values and one of the determined integral column sums or the determined integral row sums for of a pixel immediately preceding the corresponding one of the plurality of portions falling entirely within the first part or the second part; and
determining a first sum, the first sum being a sum of the second plurality of values.

10. The method of claim 9, wherein for one or more of the identified portions falling within the first part and the second part, the determining the at least one of the column-wise sum and the row-wise sum includes,
determining a third plurality of values and a fourth plurality of values, wherein
each of the third plurality of values represents one of the determined integral column sums or the determined integral row sums for a last pixel of a first segment of one of the identified portions falling within the first part and the second part, the first segment of the pixel values falling within the first part of the image, and each of the fourth plurality of values represents one of the determined integral column sums or the determined integral row sums for a last pixel of a second segment of the one of the identified portions falling within the first part and the second part, the second segment of the pixel values falling within the second part of the image;

determining a second sum, the second sum being a sum of the third plurality of values and the fourth plurality of values; and determining a sum of the first sum and the second sum, the sum of the first sum and the second sum representing the at least one of the column-wise sum and the row-wise sum.

11. A device comprising:

a processor configured to, determine at least one of integral column sums and integral row sums of an image, each of the integral column sums being associated with a first pixel in a column of pixels of the image and corresponding to a sum of a pixel value of the first pixel and any other pixel value associated with any other pixel in the column of pixels that precedes the first pixel, each of the integral row sums being associated with a second pixel in a row of pixels of the image and corresponding to a sum of a pixel value of the second pixel and any other pixel value associated with any other pixel in the row of pixels that precedes the second pixel;

determine at least one of a column-wise sum of pixel values and a row-wise sum of pixel values associated with an area within the image based on at least one of the determined integral column sums and the determined integral row sums corresponding to a plurality of the pixels forming the area; and detect an object within the image based on at least one of the determined column-wise sum and the determined row-wise sum.

12. The device of claim 11, wherein the processor is further configured to determine the area for which at least one of the column-wise sum of pixel values and the row-wise sum of pixel values is to be determined.

13. The device of claim 11, wherein the processor is configured to determine the at least one of the column-wise sum and the row-wise sum by, identifying a plurality of portions forming the area, the plurality of portions being portions of columns forming the image when the determining determines the column wise sum and the plurality of portions being portions of rows forming the image when the determining determines the row-wise sum, and determining a first plurality of values, each of the first plurality of values representing one of the determined integral column sums or the determined integral row sums for a last pixel of one of the plurality of portions, a designation of a pixel as the last pixel being based on a direction of integration according to which the integral column sums or the integral row sums are determined.

14. The device of claim 13, wherein the processor is configured to determine the at least one of the column-wise sum of and the row-wise sum further by determining a second plurality of values, each of the second plurality of values representing a difference between one of the first plurality of values and one of the determined integral column sums or the determined integral row sums for a pixel immediately preceding the corresponding one of the plurality of portions.

15. The device of claim 14, wherein the processor is configured to determine the at least one of the column-wise sum and the row-wise sum further by determining a sum of the second plurality of values, the sum of the second plurality of values representing the at least one of the column-wise sum and the row-wise sum.

16. The device of claim 11, wherein the processor is configured to determine the at least one of the column-wise sum and the row-wise sum by, identifying a plurality of portions forming the area, the plurality of portions being portions of columns forming the image when the determining determines the column wise sum and the plurality of portions being portions of rows forming the image when the determining determines the row-wise sum;

grouping the identified plurality of portions into sets, each set including two or more of the plurality of identified portions;

for each one of the sets, simultaneously determining a sum of a first plurality of values and a sum of a second plurality of values, wherein each of the first plurality of values represents one of the determined integral column sums or the determined integral row sums for a last pixel of one of the two or more of the plurality of identified portions of the corresponding one of the sets, a designation of a pixel as the last pixel being based on a direction of integration according to which the integral column sums or the integral row sums are determined, and each of the second plurality of values representing one of the determined integral column sums or the determined integral row sums for a pixel immediately preceding the corresponding one of the two or more of the plurality of identified portions of the corresponding one of the sets, and determining a plurality of difference values, each of the plurality of difference values representing the difference between the sum of the first plurality of values for one of the sets and the corresponding sum of the second plurality of values.

17. The device of claim 11, wherein the processor is further configured to, determine at least one additional area within the image; and determine at least one of the column-wise sum and the row-wise sum associated with pixels forming the determined at least one additional area simultaneously with the determining of the at least one of the column-wise sum and the row-wise sum associated with the area.

18. The device of claim 11, wherein the processor is further configured to, identify a plurality of portions forming the area, the plurality of portions being portions of columns forming the image when the determining determines the column wise sum and the plurality of portions being portions of rows forming the image when the determining determines the row-wise sum;

divide the image into at least a first part and a second part;

determine at least one of the integral column sums and the integral row sums for pixels of the image in each part of the image;

identify in which of the first part and the second part, each of the plurality of portions falls; and determine the at least one of the column-wise sum and the row-wise sum based on the identified part of the image in which each of the plurality of portions falls.

19. The device of claim 18, wherein for one or more of the identified portions falling entirely within the first part or the second part, the processor is configured to determine the at least one of the column-wise sum and the row-wise sum by,
- determining a first plurality of values, each of the first plurality of values representing one of the determined integral column sums or the determined integral row sums for a last pixel of one of the identified plurality of portions falling entirely within the first part or the second part, a designation of a pixel as the last pixel being based on a direction of integration according to which the integral column sums or the integral row sums are determined,
- determining a second plurality of values, each of the second plurality of values representing a difference between one of the first plurality of values and one of the determined integral column sums or the determined integral row sums for of a pixel immediately preceding the corresponding one of the plurality of portions falling entirely within the first part or the second part; and
- determining a first sum, the first sum being a sum of the second plurality of values.

20. The device of claim 19, wherein for one or more of the identified portions falling within the first part and the second part, the processor is configured to determine the at least one of the column-wise sum and the row-wise sum by,
- determining a third plurality of values and a fourth plurality of values, each of the third plurality of values represents one of the determined integral column sums or the determined integral row sums for a last pixel of a first segment of one of the identified portions falling within the first part and the second part, the first segment of the pixel values falling within the first part of the image, and each of the fourth plurality of values represents one of the determined integral column sums or the determined integral row sums for a last pixel of a second segment of the one of the identified portions falling within the first part and the second part, the second segment of the pixel values falling within the second part of the image;
- determining a second sum, the second sum being a sum of the third plurality of values and the fourth plurality of values; and
- determining a sum of the first sum and the second sum, the sum of the first sum and the second sum representing the at least one of the column-wise sum and the row-wise sum.

* * * * *